INVENTOR.
Claude Hill

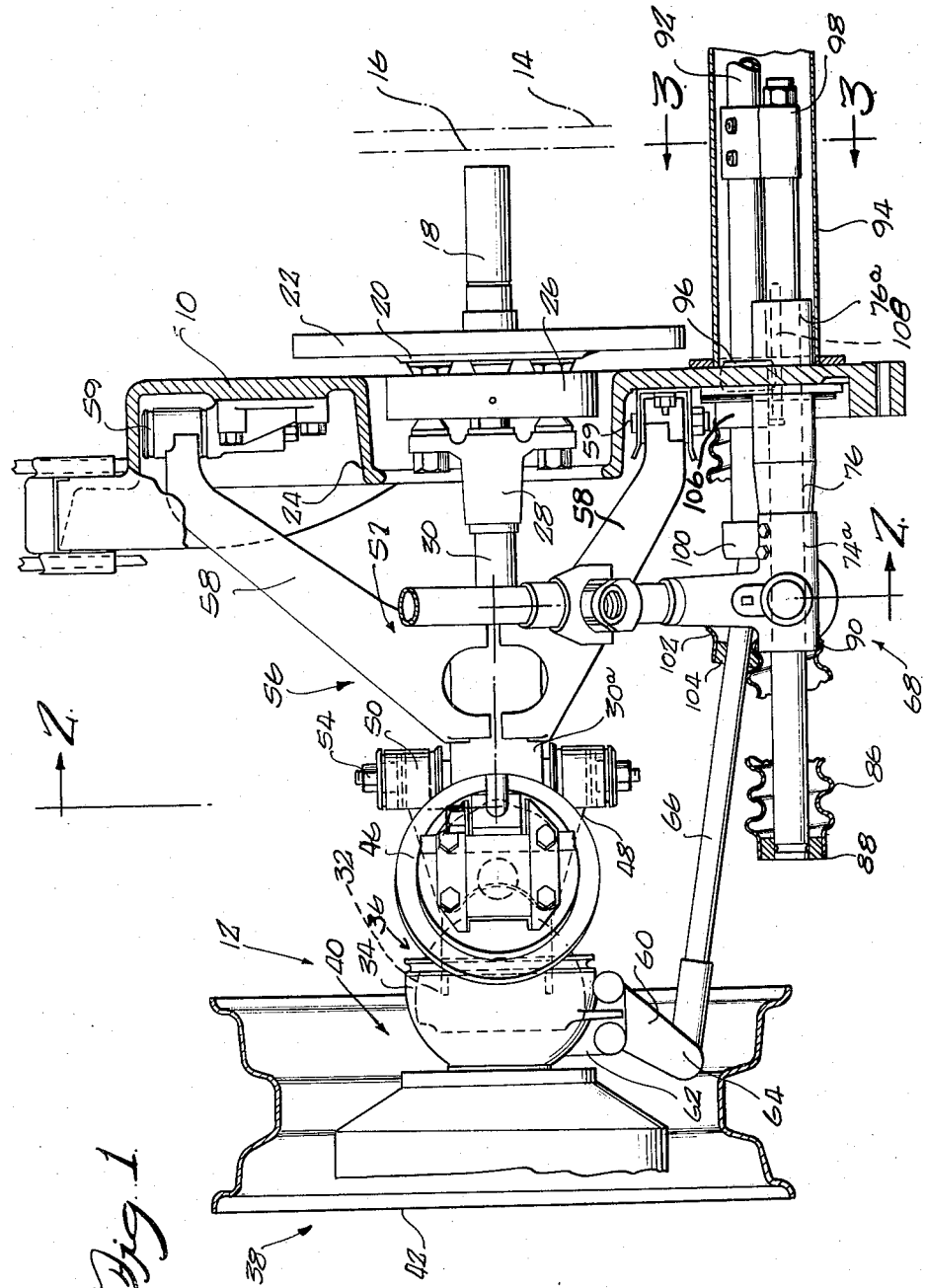

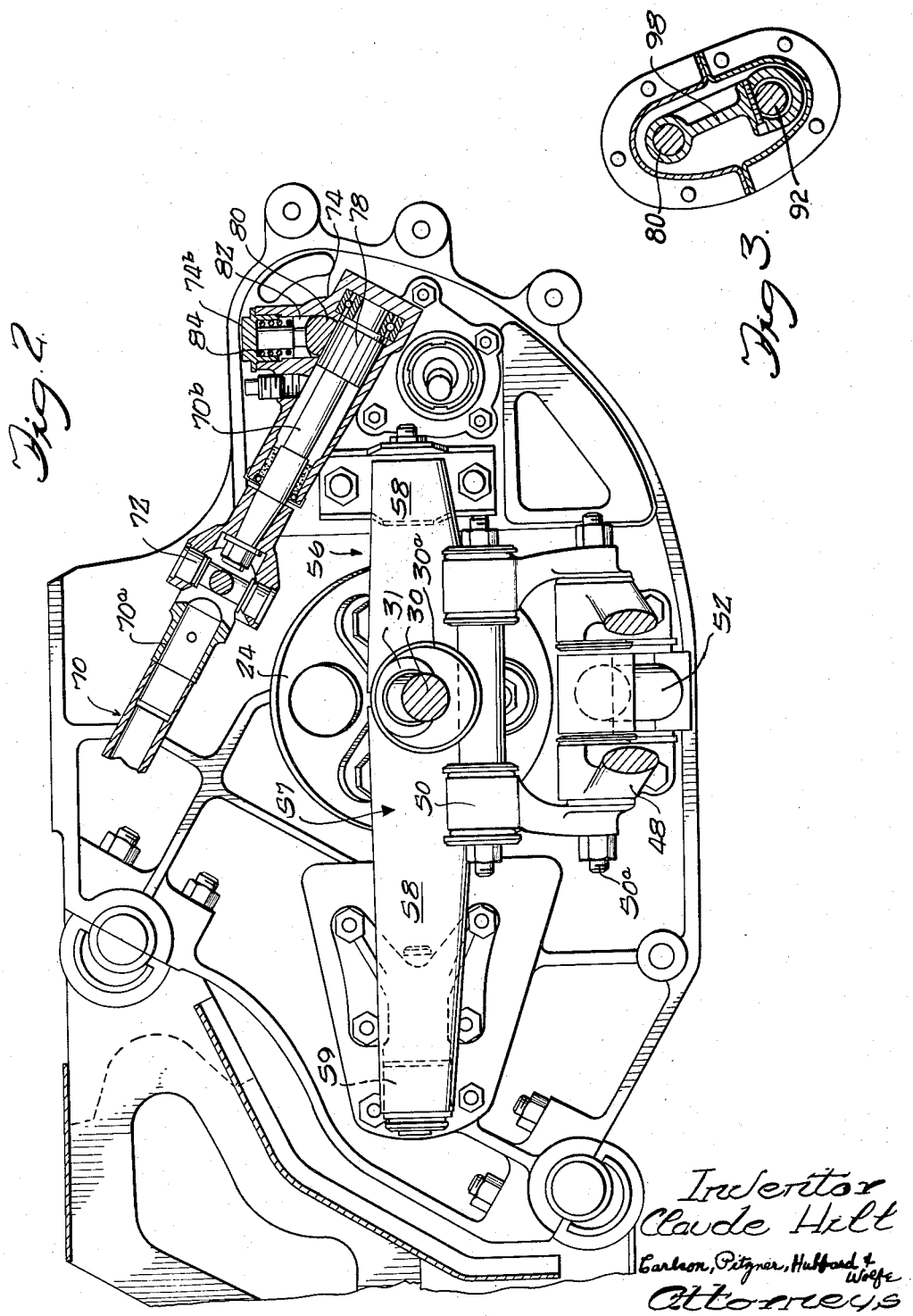

United States Patent Office 2,954,089
Patented Sept. 27, 1960

2,954,089

STEERING AND SUSPENSION MECHANISM FOR DRIVEN WHEELS

Claude Hill, Kenilworth, England, assignor to Harry Ferguson Research Limited, Stow-on-the-Wold, England Filed Aug. 16, 1955, Ser. No. 528,732

Claims priority, application Great Britain Aug. 25, 1954

2 Claims. (Cl. 180—42)

The present invention relates to steering mechanisms for motor vehicles and more particularly to rack-and-pinion type steering mechanisms of the general type disclosed in my co-pending application for U. S. patent Serial No. 332,793, filed January 23, 1953, now U.S. Patent No. 2,775,307, and assigned to the same assignee as the present invention, wherein the front wheels are employed as driving wheels as well as for steering. In such arrangements, the front wheels are associated with separate power driven half-axle assemblies universally pivoted to the vehicle chassis for up-and-down suspension movement.

In motor vehicles of this type having the power unit forwardly disposed on the chassis, such as disclosed in the above mentioned U.S. Patent No. 2,775,307, the steering mechanism is conventionally located to the rear of the power unit and usually above the change speed transmission gearing. However, where for various reasons it is desirable to shift the power unit somewhat rearwardly on the chassis, a difficulty is encountered in locating the steering mechanism so that it is mounted on the chassis and yet is close enough to the front wheels to give smooth steering action.

Accordingly, it is a general object of the present invention to provide an improved steering mechanism for use in a vehicle having independently suspended front-wheels, which mechanism is adapted for location forward of the front wheel half-axle assemblies whereby steering may be effected without interference with the vehicle engine and transmission gearing.

It is an allied object of the present invention to provide a steering mechanism of such type whereby relative up-and-down road motion between the vehicle chassis and the independently suspended front half-axle assemblies will not cause any inadvertent steering action so as to turn the road wheels when such turning is not desired.

It is another object of the invention to provide a steering mechanism of the above type wherein rack-and-pinion gearing is employed for transmitting steering motion from the vehicle steering column to the front road wheels through a pair of push-pull links connected with appropriate steering knuckle arms and located forwardly of the front half-axle assemblies.

It is an associated object of the invention to provide such a steering mechanism wherein the rack-and-pinion gearing is remotely located with respect to the push-pull links and is operatively associated therewith by means of a connector member affixed to the push-pull links on opposite sides of the vehicle and connected to the rack so as to transmit the movements thereof through the links and to the steering arms. It is a further allied object to provide such a rack-and-pinion steering mechanism wherein the connector member is completely supported by suitable bearings carried by the chassis so that the rack is subjected to purely axial thrust and is safeguarded against oblique reactive forces from the push-pull links.

Finally, it is an object of the present invention to provide a steering mechanism for use with independently suspended front wheel drive vehicles, which mechanism is economically manufactured, simple to assemble and repair, and requires a minimum of care and maintenance.

Other objects and advantages of the invention will become apparent upon reading the attached detailed description, and upon reference to the drawings, wherein:

Figure 1 is a plan view, partly in section, of the front wheel half-axle assembly at the right hand side of a motor vehicle.

Fig. 2 is a vertical sectional view taken along the line 2—2 in Fig. 1.

Fig. 3 is a vertical sectional view taken along the line 3—3 in Fig. 1.

Figure 4:
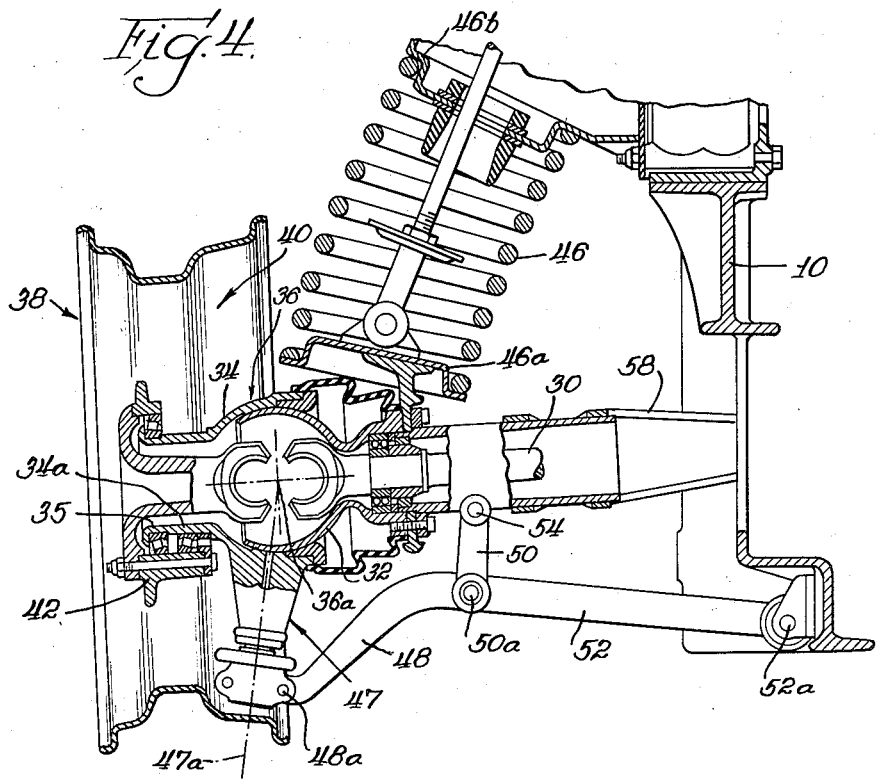
Fig. 4 is a transverse vertical section taken at the axis of one of the axles which transmit the drive to the front road wheels, as viewed from the front of the vehicle.

While the invention has been described in connection with a preferred embodiment, it will be understood that it is not intended to limit the invention thereto but it is intended to cover all modifications and alternative constructions falling within the spirit and scope of the appended claims.

Turning now to the drawings, an exemplary vehicle is here illustrated. Since the front suspension is identical for each front wheel, the following description of one side will suffice for both. At the outset it should be noted that the present front suspension is of the genus disclosed and claimed in my Patent No. 2,775,307 to which reference may be had for details of the suspension employed herein.

The vehicle includes a central frame or chassis (not shown) to which are attached a pair of castings 10 (only one shown) affixed to the fore-and-aft main chassis members. The vehicle power unit (also not shown) is supported by the castings 10 and the entire chassis is suspended in relation to the front wheel half-axle assemblies 12, as will be discussed. The illustrative vehicle is one in which the engine extends above the front axle assemblies 12 in such a manner as to prohibit location of the vehicle steering mechanism in the conventional position rearward of these assemblies. For reference purposes, the central vertical plane of the engine is indicated by the line 14 and the central fore-and-aft plane of the vehicle is indicated by the line 16.

Referring now particularly to Fig. 1, it will be observed that the output shaft 18 of the power unit (not shown) carries an end flange 20 adapted to receive a bolted annular disc 22 to form a disc brake of any suitable known construction, the other parts of which are not shown. The same bolts which secure the brake disc 22 to the flange 20 may extend into a neck 24 provided in each of the castings 10 to mount a deformable, resilient element, preferably a rubber disc 26 and a spider 28 rigidly secured to the inner end of the front half-axle or shaft 30. The spider, in turn, carries bolts engaged in the remaining holes of the rubber disc 26. Such a resilient universal joint has been described in the co-pending application of Anthony Rolt et al. for U.S. patent, Serial No. 395,978, filed December 3, 1953 of common ownership with the present application, and reference may be made to Patent No. 2,796,943 now issued from that application for further details of the joint construction.

Attention may now be given briefly to the relation between the vehicle chassis and the vertically swingable half-axle assembly 12. It will be seen that the half-axle 40 is rotatively disposed within a half-axle housing 30a and the outer portion of this axle is journaled in a self-aligning type bearing 31 (Fig. 2) carried by the inner end of an inner ball joint component 32 which, by cooperating with an outer ball joint component 34 forms a front wheel universal joint 36.

The power driven wheel and axle assembly here employed is substantially the same as that disclosed in my co-pending application for U.S. patent, Serial No. 499,713, filed April 6, 1955 (now abandoned), and reference may be made to that application for details of this assembly. Suffice it to say that the front road wheel 38 is mounted upon a stub-axle assembly 40 (Fig. 4) which includes a non-rotatable sleeve 34a for mounting the wheel, the sleeve being integrally formed with the outer ball joint component 34 of the universal joint 36. A suitable stub axle bearing 35 is included with the assembly 40 for journaling the wheel hub 42 on the non-rotatable sleeve. Thus, a live connection is established between the output shaft 18 of the power unit and the wheel hub 42, permitting the entire wheel and half-axle to swing vertically with respect to the vehicle chassis, and the wheel to swing universally about the end of the half-axle for steering purposes.

Spring means for the front suspension arrangement is provided by vertically disposed coil spring 46 interposed between an upstanding boss 46a (Fig. 4) on the half-axle and a downwardly extending boss 46b on the underside of the chassis.

The control linkage for the half-axle suspension is substantially the same as that shown in the above referred to U.S. Patent No. 2,796,943. For purposes of disclosing the present invention it is sufficient to state that the control linkage includes a lower system of duplex links 48 extending upwardly and inwardly from a pivot connection 48a to the lower end of the kingpin assembly 47 which is carried beneath the outer ball joint component 34. The duplex links 48 are pivotally connected at their medial portions with a vertically disposed shackle 50 which is pivoted at 54 to the underside of the half-axle casing 30a and carries a single transverse pivot bolt 50a. Also connected to the shackle 50 is a link 52 which extends inwardly and downwardly from the shackle to a low level pivotal connection 52a with the vehicle chassis. Thus, the shackle bolt 50a serves as the pivotal connection for the links 48 and the link 52.

The control linkage is completed in the mechanism newly described herein by the provision of a chassis supporting yoke 56 of wishbone type interposed between the casting 10 and the shackle 50. From the drawings it will be seen that the yoke 56 comprises a body portion 57, which surrounds and is welded to the half-axle casing 30a adjacent the shackle 50, and a pair of oppositely disposed limbs 58 which are connected at spaced points to the casting 10 by a pair of pivot bolts 59. Thus, the swinging yoke 56 forms the component of the control linkage between the vehicle chassis and the road-wheel half-axle assembly 12 and the aligned fore-and-aft pivotal connections at 59 are seen to be spaced sidewise from the central fore-and-aft plane 16 of the vehicle.

Thus, it is apparent that the suspension means for each of the power driven front half-axle assemblies 12 includes a swinging link in the form of the yoke 56, the limbs 58 of which are pivotally connected as at 59 to the vehicle chassis so that the link can swing up and down about the fore-and-aft axis of the pivotal connections. The yoke body 57 is disposed outwardly with respect to the chassis and attached to a non-rotary axle component (the half-axle casing 30a) which latter is in proximity to the road wheel 38.

Steering of the front wheels is accomplished by pivoting the universal joint 36 about the axis 47a defined by the kingpin assembly 47 (Fig. 4). A steering knuckle arm 60 (Fig. 1) is bolted to a pad 62 which is integral with the outer ball joint component 34, and the arm 60 is connected at its front end to a transverse push-pull link or tie rod 66 by means of a ball and socket joint 64.

In accordance with the present invention, a steering mechanism 68 is provided including a rack-and-pinion assembly located forward of the front half-axle assemblies 12 and yet so arranged with respect to the front suspension control linkage that there is no inadvertent steering motion imparted to the vehicle due to rise and fall of the chassis with respect to the road wheels when the vehicle passes over bumps and obstructions in the road. In this instance, the steering mechanism 68 includes a steering column 70 (Fig. 2) which is offset to one side of the associated casting 10 because of the location of the vehicle motor. The column 70 extends upwardly into the driver's compartment of the vehicle and comprises an upper tubular member 70a and an aligned lower shaft 70b jointed thereto by means of a universal joint 72. The main support for the steering column 70 is provided by a hollow T-shaped rack casing 74 in which the steering shaft 70b is journaled and which has a transverse portion 74a rigidly attached to the casting 10 by means of a tubular arm 76. As will be observed the tubular arm has a portion 76a which extends slightly inwardly through a suitable opening in the associated casting 10.

Splined to the extreme lower end of the steering shaft 70b is a pinion 78 which is engageable with a rack gear 80 arranged transversely of the vehicle and movable through the transverse portion 74a of the rack casing. To prevent slackness which would otherwise occur with wear of the rack-and-pinion teeth, the rack 80 is held in continuous mesh with the pinion 78 by a presser 82 mounted in an upper projection of the rack casing 74. The presser 82 is maintained in sliding contact with the smooth upper surface of the rack 80 by a compression spring 84 interposed between the top of the presser 82 and a cap 74b which seals the upper projection of the rack casing 74. The rack casing 74 also forms an oil bath for the parts within it, being provided with suitable oil seals (not shown) at its various openings.

As shown, the outer end of the rack 80 is fitted with a bellows type seal 86 which extends from the rack casing 74 and totally encloses the length of rack projecting outwardly from the casing. The bellows 86 is supported by a pair of spaced collars 88, 90, located respectively on the end of the rack 80 and on the outer end of the transverse casing portion 74a.

Because of the spacing of the steering column 70 sidewise of the central casting 10, it is obvious that it would be manifestly impossible to directly connect the push-pull link 66 to the ends of the rack 80. Accordingly, means are provided for operatively connecting these elements, such means including a transverse connector member or bar 92 symmetrically arranged as a rigid component of the transversely movable rack-and-pinion steering unit. As will be seen from Fig. 1, the inner end of the rack 80 extends through the tubular arm 76 and into an oval-section casing 94 which bridges the spaced castings 10 and thereby serves not only as an enclosure for the rack unit but also as a strong cross brace for the front end of the chassis.

The connector 92 is disposed substantially within the bridging casing 94 and comprises an elongated bar having a circular cross-section. The connector is arranged somewhat beneath the rack 80 and is axially slidable near each of its ends through a self-aligning and self-lubricating bearing 96 disposed in an appropriate recess provided within each casting 10. A heavy bracket 98 secures the middle of the connector bar 92 to the inner end of the rack 80 (Figs. 1 and 3). Thus, it is seen that the assembly including the rack 80, the transverse connector 92, and the bracket 98 forms a rigid unit which is movable to-and-fro crosswise of the vehicle. As shown in Fig. 1, the middle of the transverse connector 92 coincides in the mid-portion of the steering mechanism with the central fore-and-aft plane 16 of the vehicle.

Each outwardly projecting end of the connector 92 is jointed with the adjacent end of the associated push-pull link 66 by means of a ball and socket joint 100. Again, a bellows type seal 102 is employed to house the outwardly extending end of the connector 92 and the joint 100. The bellows 102 extends between supporting collars 104, 106 provided respectively on the push-pull link 66 and the casting 10 adjacent the connector 92.

Summarizing, then, it will be observed that the steering mechanism comprises steering arms 60 on the front road wheel axle assemblies 12, a rack 80 mounted so as to be movable transversely of the vehicle, a pair of transverse push-pull links 66 and a connector 92 forming connections between the rack and steering arms, each link having pivotal connections at both ends, and a steering column 70 having a toothed pinion 78. The pinion 78 is rotatable by the steering column 70 and the arrangement is such that when the driver of the vehicle turns the steering column through some angle, the pinion moves the rack 80 a corresponding extent and the rack movement is transmitted by the connector 92 through the links 66 as a push to one steering arm and a pull to the other. The limits of steering movement are determined by a pair of adjustable stop screws 108 mounted transversely on the castings 10 within the oval-section casing 94 and arranged to stop movement of the connector bracket 98 when the limit of turning has been attained.

In keeping with an important feature of the invention, the steering mechanism and connections are arranged to insure that the road wheels are not turned, or inadvertently "steered," as the result of the wheel and axles swinging vertically relative to the vehicle frame. For this purpose, the tie link 66, which must swing up and down with the half axle 30 and the housing 30a, is so proportioned in length that it does not pull inwardly or push outwardly on the arm 64 (and thus does not turn the wheel about the steering axis 47a) as the wheel bounds and rebounds on encountering bumps or holes.

In achieving this advantageous result, the link 66 is made to swing about its inner end through an arc approximately equal to any arc traversed by the axle 30 and housing 30a in swinging vertically about the horizontal pivot axis defined by the bolts 59 and the universal coupling 26, 28. The outer end of the link 66 is made to move on a radius which is substantially equal to the radius on which the wheel moves, so there is little or no movement of the arm 60 inwardly toward or outwardly away from the vehicle frame.

Figure 5:
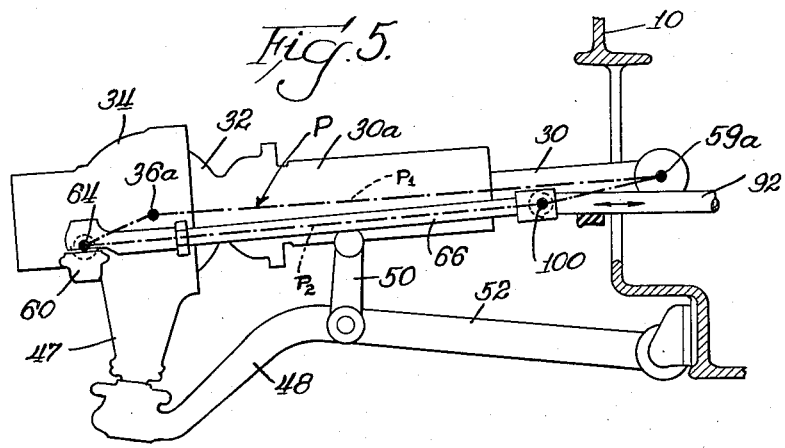
Fig. 5 is a diagrammatic view, showing in outline form the components of the steering mechanism and suspension means as illustrated in Fig. 4, and showing the approximate parallelogramic arrangement of pivotal connections therebetween.

As shown best in Fig. 5, which is a diagrammatic view looking from the front of the vehicle, the effective length of the link 66 between the centers of the universal connections 100 and 64 at its inner and outer ends, is made substantially equal to the distance between the inner pivot center 59a (defined by the bolts 59, Fig. 1) and the outer pivot center 36a (defined by the center of the universal connections 34 and 36, through which the steering axis 47a passes). As the wheel 38 swings vertically relative to the frame member 10 about the axis 59a, the link 66 will correspondingly swing about its inner connection 100. But because the outer pivot centers 64 and 36 swing through substantially equal arcs of equal radii, the center 64 is not pulled inwardly toward the frame relative to the center 36a. Therefore, the wheel is not turned about the steering axis as the wheel bounds and rebounds.

It will be noted that as illustrated in Fig. 5, the distance between the pivot points 100 and 64 is slightly less than the distance between the pivot centers 59a and 36a. This is simply to indicate that these distances need not be precisely equal in order to secure satisfactory performance. They need only be approximately equal to provide to a practical extent the advantage described.

In many instances it will be impractical to locate the pivot centers 100, 64, 59a and 36a on the same vertical level. As indicated in Fig. 5, the universal pivots 100, 64 at the inner and outer ends of the link 66 are spaced below the pivot centers 59a and 36a for the suspension linkage. Moreover, due to space limitations, the universal pivot 100 may have to be located outwardly away from the frame, so that it is laterally displaced from the pivot center 59a. Under these circumstances, the desired immunity to spurious steering action as the wheel bounds and rebounds is achieved by geometrically locating the four pivot points 59a, 36a and 100, 64 so that they define the corners of an approximate parallelogram P, shown by dot-dash lines in Fig. 5. Since the sides P1 and P of the parallelogram P are approximately equal in length the distances between the pivot centers 59a, 36a and 100, 64 are approximately equal. As the suspension linkage formed by the half axle 30 and the axle housing 30a swings vertically about the horizontal pivot axis 59a, the steering link 66 will swing about the pivot center 100. The pivot centers 36a and 64 will traverse arcs of substantially equal angular extent and equal radii, so that the link 66 will not pull inwardly or push outwardly on the steering arm 60 (Fig. 1), and the wheel will not be turned about its steering axis 47a.

I claim as my invention.

1. In a vehicle having a frame and a power unit mounted forwardly thereon, the combination comprising a live half axle and means universally connecting its inner end to be driven from said power unit, a housing for said axle and first pivot means connecting said housing to the frame to swing vertically about a horizontal axis passing through the effective center of said universally connecting means, a stub axle universally connected to the outer end of said half axle, a universal ball joint having a first part fixed to the outer end of said housing and a second part journaling said stub axle, a steering mechanism including a rack mounted on the frame forwardly of the power unit, a steering column located outwardly from the horizontal axis of said first pivot means, a pinion on said column meshed with said rack, a connector rod rigidly fixed to said rack and movable transversely of the vehicle therewith, a link universally pivoted at its one end to said rod, said last pivot connection being located inwardly from said steering column, means universally pivoting the other end of said link to said second ball joint part, the centers of said universal pivots at the end of said link and the centers of said first pivot means and said ball joint being located substantially at the corners of a parallelogram, as viewed from the front of the vehicle so that the stub axle is not turned relative to the half axle as a result of the latter swinging vertically relative to the frame.

2. In a vehicle having a frame including a pair of spaced, longitudinally-extending side frame members and a power unit mounted forwardly on said frame, the combination comprising a live half axle and means universally connecting its inner end to be driven from said power unit, a housing for said axle and first pivot means connecting said housing to the frame to swing vertically about a horizontal axis passing through the effective center of said universal connecting means, a stub axle universally connected to the outer end of said half axle, a universal ball joint having a first part fixed to the outer end of said housing and a second part journaling said stub axle, a steering mechanism including a rack mounted on the frame forwardly of the power unit, a steering column located outwardly from the horizontal axis of said first pivot means, a pinion on said column meshing with said rack, a connector rod rigidly fixed to said rack and movable transversely of the vehicle therewith, a tubular cross brace enclosing said connector rod and interconnecting said spaced, longitudinally-extending side frame members a link universally pivoted at its one end to said rod, said last pivot connection being located inwardly from said steering column, means universally pivoting the other end of said link to said second ball joint part, the centers of said universal pivots in the ends of said link and the centers of said first pivot means and said ball joint being located substantially at the corners of a parallelogram as viewed from the front of the vehicle, so that the stub axle is not turned relative to the half axle as a result of the latter swinging vertically relative to the frame.

References Cited in the file of this patent

UNITED STATES PATENTS

| | | |
|---|---|---|
| 894,060 | Ruemelin | July 21, 1908 |
| 1,058,758 | Kennedy | Apr. 15, 1913 |
| 1,116,791 | Brown | Nov. 10, 1914 |
| 2,039,671 | Wagner | May 5, 1936 |
| 2,075,085 | Paton | Mar. 30, 1937 |

FOREIGN PATENTS

| | | |
|---|---|---|
| 563,917 | France | Dec. 17, 1923 |
| 408,228 | Great Britain | Mar. 19, 1934 |
| 532,566 | Great Britain | Jan. 27, 1941 |
| 619,605 | Great Britain | Mar. 11, 1949 |